United States Patent [19]

Morrison et al.

[11] Patent Number: 5,002,288
[45] Date of Patent: Mar. 26, 1991

[54] POSITIVE VARIABLE CLEARANCE LABYRINTH SEAL

[75] Inventors: Bruce L. Morrison, Schenectady; Alexander Morson, Clifton Park, both of N.Y.

[73] Assignee: General Electric Company, Schenectady, N.Y.

[21] Appl. No.: 257,471

[22] Filed: Oct. 13, 1988

[51] Int. Cl.⁵ .............................................. F16J 15/44
[52] U.S. Cl. ........................................ 277/27; 277/53; 277/148; 415/174.5
[58] Field of Search .................... 277/3, 27, 53, 58, 59, 277/72 R, 79, 142, 143, 151, 188 R, 149, 148; 415/170.1, 174.2, 174.5

[56] References Cited

U.S. PATENT DOCUMENTS

| | | | |
|---|---|---|---|
| 1,918,707 | 7/1933 | Mellor | 277/148 |
| 2,279,863 | 4/1942 | Downer | 415/174.5 X |
| 2,520,369 | 8/1950 | McFall | 277/151 X |
| 3,268,232 | 8/1966 | Richards | 277/59 |
| 3,377,073 | 4/1968 | Harney | 277/27 |
| 3,594,010 | 7/1971 | Warth | 277/53 |
| 3,698,728 | 10/1972 | Walker | 277/188 R X |
| 3,967,829 | 7/1976 | Rogers | 277/149 |
| 4,017,088 | 4/1977 | Lerjen | 277/53 |
| 4,436,311 | 3/1984 | Brandon | 277/27 |
| 4,451,046 | 5/1984 | Bliven | 277/27 X |
| 4,513,975 | 4/1985 | Hauser et al. | 415/174.4 X |

OTHER PUBLICATIONS

Tsunoda, Kikuchi, Ikeda: "Clearance Control System of Packing Rings for Steam Turbine", 12/1/87.

Primary Examiner—Allan N. Shoap
Assistant Examiner—Scott Cummings
Attorney, Agent, or Firm—Nixon & Vanderhye

[57] ABSTRACT

An adjustable labyrinth seal for a steam turbine wherein the packing rings may be displaced from a larger diameter position, affording a relatively larger shaft clearance, to a smaller diameter position, affording a relatively smaller shaft clearance. Steam conduits are provided in the turbine casing communicating with the annular space between the individual packing rings and the grooves in which they are retained. The rings are provided with seals and are so configured as to maintain pressure- retaining contact with the sidewalls of the grooves. Steam, at a pressure in excess of the operating pressure of the individual seal, may be admitted to the annular space of the upstream ring to controllably effect the displacement thereof. Steam, at the turbine inlet pressure, is admitted to the annular spaces of the remaining rings to effect their displacement. In a further embodiment, one or more of the remaining rings may receive pressurized steam from an external source to control precisely the time at which they close.

18 Claims, 4 Drawing Sheets

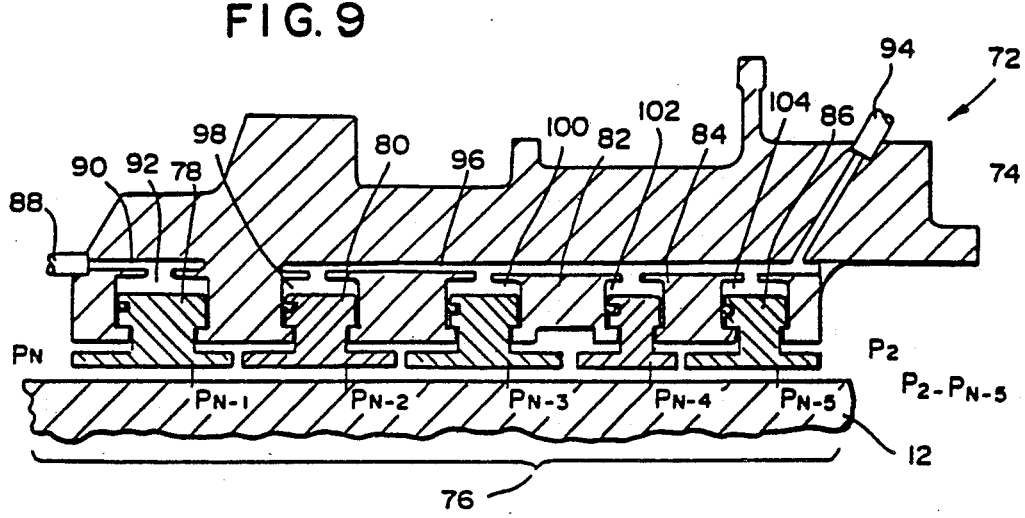
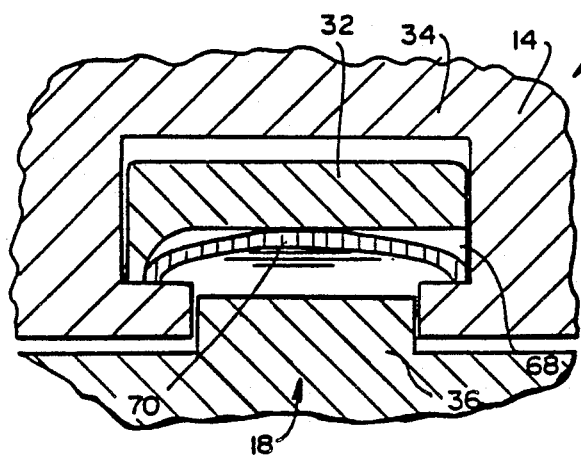
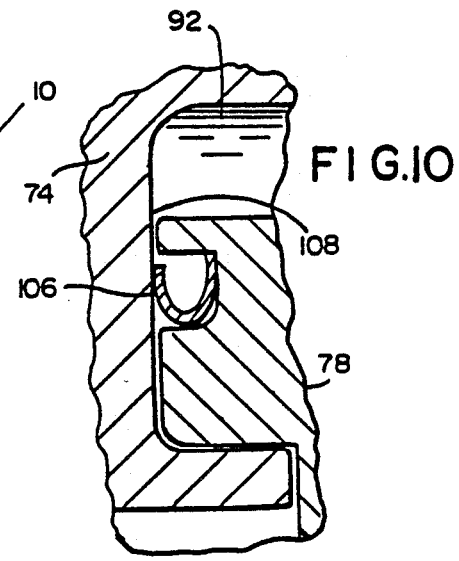
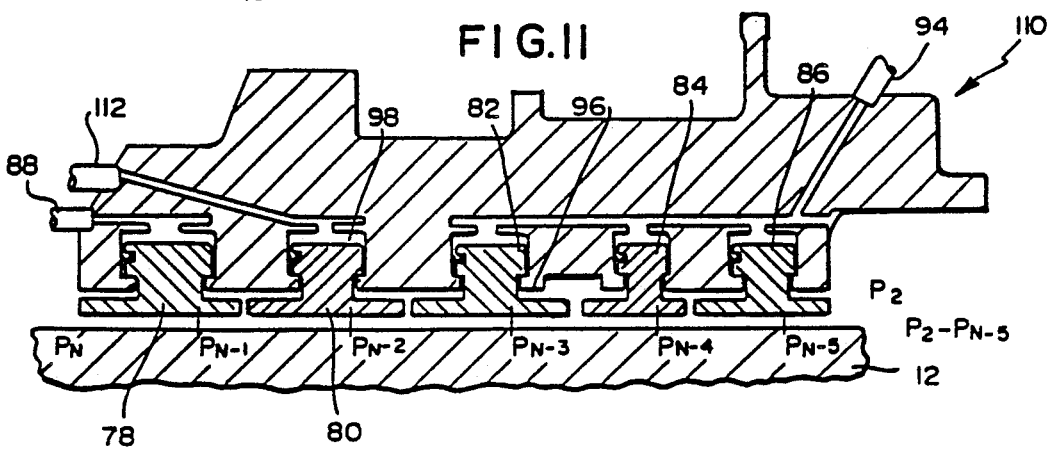

POSITIVE VARIABLE CLEARANCE LABYRINTH SEAL

BACKGROUND OF THE INVENTION

The present invention pertains generally to labyrinth seals of the type used in steam turbines and, more particularly, to such seals wherein the clearance between the seal and the shaft may be controlled, adjusted, or varied in response to changes in the operating conditions of the turbine.

Non-contacting packing ring labyrinth seals are commonly used in steam turbines to prevent excessive steam leakage between regions of differential pressure. Such seals conventionally comprise a series (generally five or six) of packing or sealing rings disposed in annular grooves in the turbine casing. These rings typically include a plurality of spaced-apart annular teeth extending radially inward from the turbine casing to within close proximity of the rotating shaft surface, with the amount of the clearance determining the rate of leakage. The effectiveness of these seals is a major factor in determining the efficiency of the turbine, since leakage of steam through the seals results in a loss of work-producing energy in the system.

It is common practice, during start-up, to preheat the high pressure (HP) section of a turbine by pressurizing it with steam while the shaft is being rotated by turning gear. In a combined high pressure and reheat opposed flow turbine section, excessive steam leakage past the intersectional packing seal may lead to undesirable "turning gear roll-off" and damage to the system. Control of the clearances between the rings and the shaft is, also important for the safe operation of the turbine system.

Maintenance of proper clearance is complicated by vibration of the shaft and distortion of stationary components, particularly during periods when it is accelerating or decelerating through its critical speeds as well as thermal transients. These events occur during start-up and shut-down and during major load changes. Thus, during steady state operation of the turbine, such as occurs under significant load, relatively smaller clearance is desired. Relatively larger clearance is required, however, during occurrence of transients, so as to avoid rubbing and damage to the seals and shaft.

Prior attempts to satisfy these two conflicting requirements involved provision for the radial displacement of the segmented sealing rings between a larger diameter position, where a relatively larger clearance accommodated shaft transients, and a smaller diameter position, where a relatively smaller clearance minimized leakage around the steady shaft. Such a system is disclosed, for example, in U.S. Pat. No. 4,436,311 wherein springs bias the segmented sealing rings radially outwardly, the basing force being overcome by steam pressures within the turbine as it comes up to steady-state operation. As will be described more fully hereinafter, this system suffers in that each of the rings in the series is acted upon by a different force, which force is partly determined by the position or condition of the upstream rings, such that closure of each ring in the series prevents or delays closure of succeeding downstream rings. This system also fails to solve the problem of steam leakage control during prewarming.

A second such prior art system, disclosed in a paper entitled *Clearance Control System of Packing Rings for Steam Turbine* by E. Tsunoda, M. Kikuchi and T. Ekeda at the Seminar on FOSSIL PLANT RETROFITS FOR IMPROVED HEAT RATE AND AVAILABILITY, Dec. 1-3, 1987, at San Diego Calif., utilized bellows to facilitate the radially inward displacement of the packing ring segments, the bellows being operated by the admission thereto of operating steam, each bellows being operated upon by steam passing upstream of its own packing rings. For reasons which will be hereinafter explained, this system suffers from the same shortcoming as that previously described. In addition, it is believed that reliability problems inherent in the use of bellows in the hostile environment of a steam turbine makes attractive an alternative.

OBJECTS AND SUMMARY OF THE INVENTION

Accordingly, it is an object of the invention to provide a labyrinth seal for a steam turbine which overcomes the drawbacks of the prior art.

It is another object of the invention to provide a labyrinth seal wherein a relatively smaller clearance is maintained between the seals and the shaft during periods of steady state operation, and a relatively larger clearance is maintained during periods when transients are likely.

It is yet another object of the invention to provide a labyrinth seal wherein the several packing rings may be displaced from a larger diameter position, affording a relatively larger shaft clearance, to a smaller diameter position, affording a smaller clearance.

It is a still further object of the invention to provide a labyrinth seal as aforesaid wherein the displacement of the first or upstream packing ring is controlled by means independent of the operating pressure of the seal environment.

Briefly stated, the present invention provides an adjustable labyrinth seal for a steam turbine wherein the packing rings may be displaced from a larger diameter position, affording a relatively larger shaft clearance, to a smaller diameter position, affording a relatively smaller shaft clearance. Steam conduits are provided in the turbine casing communicating with the annular space between the individual packing rings, and the grooves in which they are retained. The rings are provided with seals and are so configured as to maintain pressure-retaining contact with the sidewalls of the grooves. Steam, at a pressure in excess of the operating pressure of the individual seal, may be admitted to the annular space of the upstream ring to controllably effect the displacement thereof. Steam, at the turbine inlet pressure, is admitted to the annular spaces of the remaining rings to effect their displacement. In a further embodiment, one or more of the remaining rings may receive pressurized steam from an external source to control precisely the time at which they close.

According to an embodiment of the invention, there is provided an improved labyrinth seal for minimizing leakage between rotating and stationary components of an elastic fluid turbine, the seal comprising: a plurality of segmented seal rings supported by, and at least partially contained in annular grooves formed in the stationary turbine casing to permit motion of each of the seal rings between a larger diameter position and a smaller diameter position corresponding respectively to larger and smaller clearances of the seal rings with regard to the rotating shaft, the seal ring grooves each being partially defined by a pair of opposing spaced apart shoulders on the casing which form an opening of the groove extending radially into the clearance area between the casing and the rotating shaft, each segment of each of the seal rings including an inner arcuate portion having seal teeth extending therefrom in the direction of and adjacent to the rotating shaft, a radially outwardly facing arcuate surface on the seal ring segment which is located opposite to a radially inward facing arcuate surface of the casing for limiting the larger clearance position by contact between the opposing surfaces, an outer ring portion disposed within one of the seal ring grooves for both axial and radial movement therein and having a pair of shoulders, extending axially in opposite directions for making radial contact respectively with the pair of spaced apart shoulders on the casing and thereby limiting the smaller clearance position, and a neck portion connected between the inner arcuate portion and the outer ring portion and extending between the casing shoulders, the neck portion having an axial thickness which is less than the distance between the opposing casing shoulders to thereby axially locate the seal ring segment against one of the casing shoulders and provide a contact pressure seal at the downstream side of the neck portion, a radial positioning means for each of the seal rings comprising a compressed spring means biased against the ring segments to forcibly cause the segments to move to the larger clearance positions, means providing a pressure seal between the casing and the seal ring segments partially contained in the grooves therein, first conduit means for admitting fluid, at a pressure exceeding the inlet pressure of the seal, to the annular space between the casing and the segments of the upstream one of the seal rings, to controllably displace the segments to the smaller diameter positions, and second conduit means for admitting fluid, at the inlet pressure of the seal, to the annular spaces between the casing and the segments of selected ones of the seal rings, other than the upstream seal ring, whereby the segments of the selected seal rings are displaced to the smaller diameter position.

According to a feature of the invention, there is provided an improved labyrinth seal for minimizing fluid leakage between the rotating and stationary components of an elastic fluid turbine, the seal comprising a multiplicity of segmented seal rings, the seal rings being captured in annular grooves formed in the stationary casing of the turbine so as to permit motion of the therein supported seal ring between a larger diameter position and a smaller diameter position corresponding respectively to larger and smaller clearances of the seal rings with regard to the rotating shaft of the turbine, springs biasing the seal rings toward the larger diameter position, first means for controllably displacing the upstream one of the seal rings to the smaller diameter position, and second means for displacing selected ones of the seal rings, other than the upstream, to the smaller diameter position, the first means being independent of the second means.

According to a feature of the invention, there is provided for use in a steam turbine having a central rotatable shaft, a labyrinth seal for minimizing the leakage of steam between a region of higher pressure and a region of lower pressure through which the shaft extends, the labyrinth seal including a multiplicity of segmented seal rings, each of the seal rings being movably retained in an annular groove formed in the stationary casing of the turbine so as to permit motion of the seal ring between a larger diameter position and a smaller diameter position corresponding respectively to larger and smaller clearance of the seal ring with respect to the rotatable shaft, the seal rings being spring-biased toward the larger diameter position, the improvement comprising: first and second separably operably means for applying steam at a pressure at least equal to the pressure in the region of higher pressure to at least one of the seal rings to displace the seal ring to the smaller diameter position.

According to a further feature of the invention, there is provided a labyrinth seal for a steam turbine, the steam turbine being of a type including a casing and a rotatable shaft, comprising: a plurality of seal rings disposed about the shaft, the plurality of seal rings dividing the turbine into regions of higher pressure and lower pressure, means for biasing each of the seal rings in a radially outward direction, whereby a larger clearance between the seal rings and the shaft is provided, first closing means for permitting an upstream one of the seal rings, immediately adjacent the region of higher pressure, to be urged radially inward by a first supply of a pressurized fluid, thereby reducing the clearance to a smaller clearance, second closing means for permitting at least one of a remainder of the seal rings to be urged radially inward by a second supply of a pressurized fluid, thereby reducing the clearance to the smaller clearance, first means for admitting the first supply of a pressurized fluid to the first closing means, the first supply being at a pressure in excess of a pressure in the region of higher pressure, second means for admitting the second supply of pressurized fluid to the second closing means, and the first means for admitting being independent of the second means for admitting.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is a closeup cross section of a portion of one of the seal rings of FIG. 2 showing the biasing springs used for outward bias thereon, with the seal ring closed.

FIG. 6 is a partial perspective view of an extreme end portion of a sealing segment of the type illustrated in FIGS. 5 and 5a;

FIG. 9 is a cross section of a mid-span packing region of an opposed flow steam turbine including a labyrinth seal according to an embodiment of the invention.

FIG. 10 is a closeup view of a portion of a sealing ring of FIG. 6 showing a resilient seal for forming a pressure chamber thereabove.

FIG. 11 is a cross section of a steam turbine including a labyrinth seal according to a further embodiment of the invention.

DETAILED DESCRIPTION OF THE PREFERRED EMBODIMENT

Figure 1:
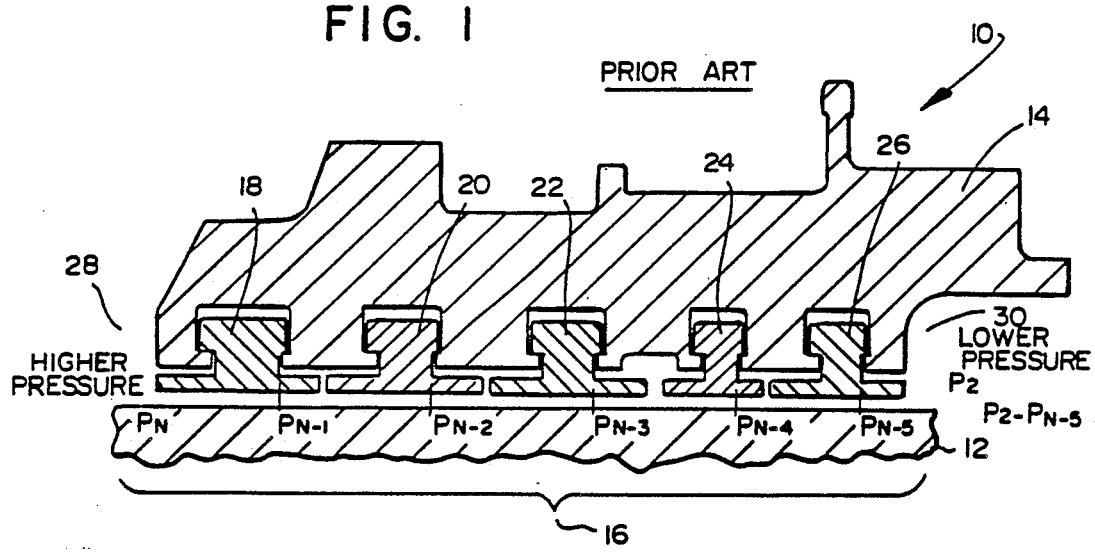
FIG. 1 is a partial cross section of a steam turbine showing a labyrinth seal according to the prior art.

Referring now to FIG. 1, there is shown, generally at 10, a portion of a prior-art steam turbine which may be, for example, a combined high pressure and reheat opposed flow steam turbine. A turbine shaft 12, disposed in a turbine housing 14, is supported for rotation by conventional means (not shown) within a turbine housing 14.

A multiple stage labyrinth seal 16 includes a plurality of sealing rings 18, 20, 22, 24 and 26 disposed about turbine shaft 12 separating a higher pressure region 28, at a pressure designated as Pn, and a lower pressure region 30, at a pressure designated Pn-5. The subscripts in the preceding sentence are intended to indicate the number of stages of labyrinth seal 16 that have been traversed by steam in passing from higher pressure region 28 to lower pressure region 30. In general, labyrinth seal 16 functions by placing a relatively large number of partial barriers to the flow of steam from higher pressure region 28 to lower pressure region 30. Each barrier forces steam, attempting to flow parallel to an axis of turbine shaft 12, to follow a tortuous path, whereby a pressure drop is created. The sum of all pressure drops in labyrinth seal 16 is, by definition, the pressure difference between higher pressure region 28 and lower pressure region 30. In some applications, steam flowing through labyrinth seal 16 is in parallel with the desired steam flow through a conventional diaphragm (not shown) of a steam turbine.

As will be evident to one skilled in the art, steam leakage through labyrinth seal 16 is a parasitic loss without contribution to the function of steam turbine 10. Accordingly, minimizing the leakage through labyrinth seal 16 is desirable during normal operation of steam turbine 10. There are however, periods in the operation of steam turbine 10 during which substantial leakage may be desired, or even mandatory.

When steam turbine 10 is idle, turbine shaft 12 is rotated at a relatively low speed by conventional turning gear to avoid bowing thereof. During startup, the elements of steam turbine 10 require prewarming on the turning gear before applying full steam temperature and pressure. As will be made clear hereinafter, steam turbine 10 lacks positive means for controlling labyrinth seal 16 in the most desirable manner during prewarming.

When turbine shaft 12 is accelerated from the relatively slow speed of the turning gear toward operating speed, it passes through one or more critical speeds at which substantial radial motion of at least a portion of turbine shaft 12 is desired. During these occasions, it is generally desirable to hold sealing rings 18-26 at a substantial distance from the nominal location of the surface of turbine shaft 12 to avoid rubbing contact therebetween and consequent damage to the elements of labyrinth seal 16. This is accomplished by expanding the diameter of sealing rings 18-26. When this is done, a substantial leakage flow of steam is permitted. Such a leakage flow of steam is not important at this time because this condition exists for only a relatively short time during startup and shutdown, and at times when steam turbine 10 is completely unloaded.

For present purposes, sealing rings 18-26 are identical. Thus, only sealing ring 18 is described in detail. It is to be noted that sealing ring 18 is disposed in the extreme upstream location in labyrinth seal 16 where its upstream end is exposed of a steam pressure of Pn. After the steam passes sealing ring 18, its pressure is reduced to Pn-1, according to the recited subscript notation.

Figure 2:
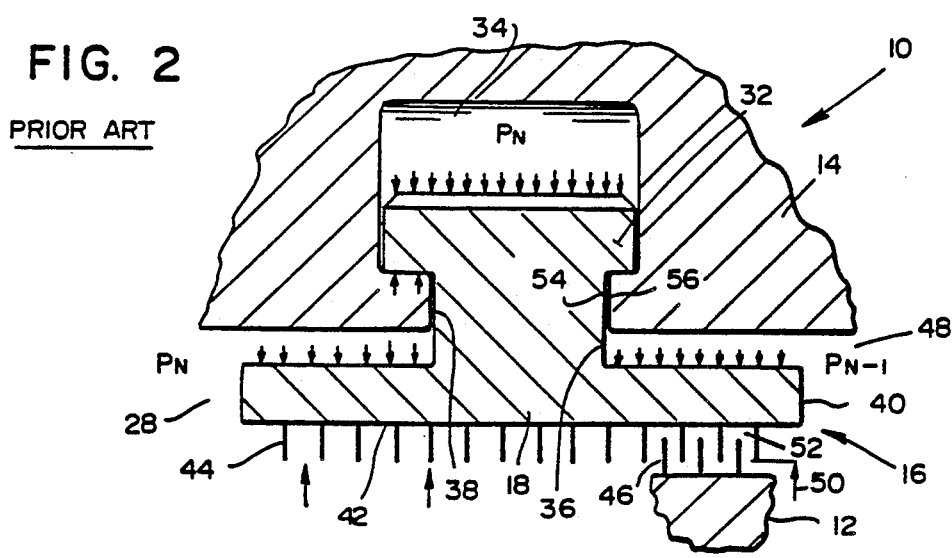
FIG. 2 is a cross section of a seal ring of the labyrinth seal of FIG. 1.

Referring now to FIG. 2, sealing ring 18, according to the cited '311 patent, includes an inner a plurality of segments, each of which includes dovetail 32 captured in a dovetail portion slot 34. A neck 36 extends through a slot 38. An annular ring 40, connected to neck 36, includes a cylindrical inner surface 42 having a plurality of seal disks 44 extending radially inward therefrom. Although not shown in FIG. 2, seal disks 44 are interfitted with a plurality of outwardly directed seal disks 46 disposed on the peripheral surface of turbine shaft 12. Steam passing from higher pressure region 28 to a outwardly directed seal disk 46, normally follows a tortuous path, being forced to flow radially inward past each seal disk 44 and being forced to flow radially outward past each outwardly directed seal disk 46. Such tortuous flow expends energy and thus increases the amount of steam which can flow past higher pressure region 28. A key determinant of leakage steam is a clearance 50 between the tips of seal disks 44 and the facing surface of turbine shaft 12, as well as a clearance 52 between the tips of outwardly directed seal disk 46 and cylindrical inner surface 42.

As noted in the preceding, clearances 50 and 52 should be as small as possible for minimum steam leakage during normal loaded operation, but should be relatively larger during acceleration and deceleration through critical speeds. These objectives are accomplished in the '311 patent by resiliently forming sealing ring 18 in four segments, resiliently biased apart to a relatively larger diameter. As steam pressure is admitted to higher pressure region 28, an inward force is developed tending to urge all segments of sealing ring 18 in the radially inward direction against the resilient outward urging. With substantial steam pressure in higher pressure region 28, sealing ring 18 experiences a force in the downstream direction which is resisted by contact of a downstream surface 54 of neck 36 with a surface 56 of slot 38. This contact seals against steam leakage therepast. Also, this contact produces substantial friction which resists the initiation of inward motion of sealing ring 18. The same is not true at the upstream side of neck 36. Since sealing ring 18 is urged in the downstream direction, a clearance exists on the upstream side which admits steam at a pressure of Pn, equal to that in higher pressure region 28, into dovetail slot 34.

The forces acting on sealing ring 18 are the net inward-directed force of steam at pressure Pn and Pn-1 acting over the areas on which they impinge, minus the net outward-directed forces acting on cylindrical inner surface 42.

During prewarming, it is desirable to close at least sealing ring 18 to prevent high-energy steam passing into lower pressure succeeding stages of steam turbine 10. Such high-energy steam could react with turbine buckets in the lower pressure stage to accelerate turbine shaft 12 into turning gear rolloff. Steam turbine 10 contains no provision for preventing leakage at the low steam pressures characteristic of those available during prewarming.

Figure 3:
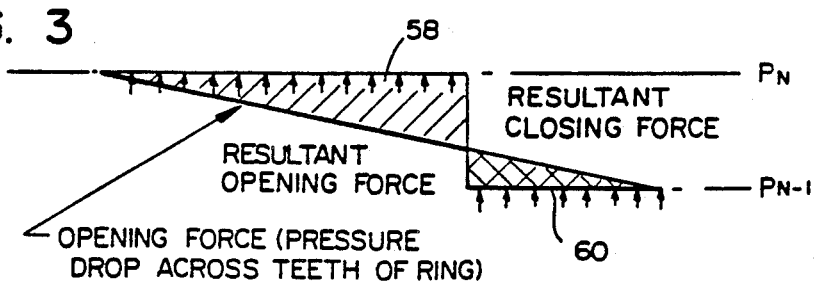
FIG. 3 is a graphical representation of the balance of forces acting on the seal ring of FIG. 2.

Referring now to FIG. 3, the balance of forces on sealing ring 18 is illustrated graphically. The forces tending to close labyrinth seal 16, that is, move it inward to the position shown, is shown as a first force triangle 58, and forces tending to open labyrinth seal 16 are shown as a second force triangle 60. The totals of these forces are proportional to the areas of the two triangles. Force triangle 58 acts in the closing direction because the pressure Pn is greater than any downstream pressure acting on cylindrical inner surface 42. Force triangle 60 acts in the opening direction because the pressure Pn-1 is smaller than any upstream pressure acting on cylindrical inner surface 42. It will be noted that the area of force triangle 58 is greater than that of force triangle 60. This comes about because the higher pressure Pn acts, not only on the portion of annular ring 40 upstream of neck 36, but also on the upper surface of dovetail 32, whereas the lower pressure Pn-1 acts only on the portion of annular ring 40 downstream of neck 36. This difference in area is due to the seal at the contact between downstream surface 54 and surface 56.

As the steam pressure increases with increased loading, the difference between the forces represented by the areas of force triangles 58 and 60 becomes great enough to overcome the outward bias and the frictional resistance. Once motion begins, it proceeds rapidly until sealing ring 18 reaches the fully closed condition shown in FIG. 2.

During deceleration of steam turbine 10, steam pressure is reduced to a value at which the resilient force urging sealing ring 18 radially outward exceeds the sum of forces represented by force triangles 58 and 60, plus the frictional force resisting motion. When this occurs, sealing ring 18 moves from its closed position shown fully outward to its open position.

When considered in isolation, the foregoing description indicates that sealing ring 18 operates positively at points in the normal increase and decrease in steam pressure to move sealing ring 18 between its open position and its closed position. However, when the operation of the totality of labyrinth seal 16 is considered, certain problems occur with the device of the '331 patent.

Figure 4:
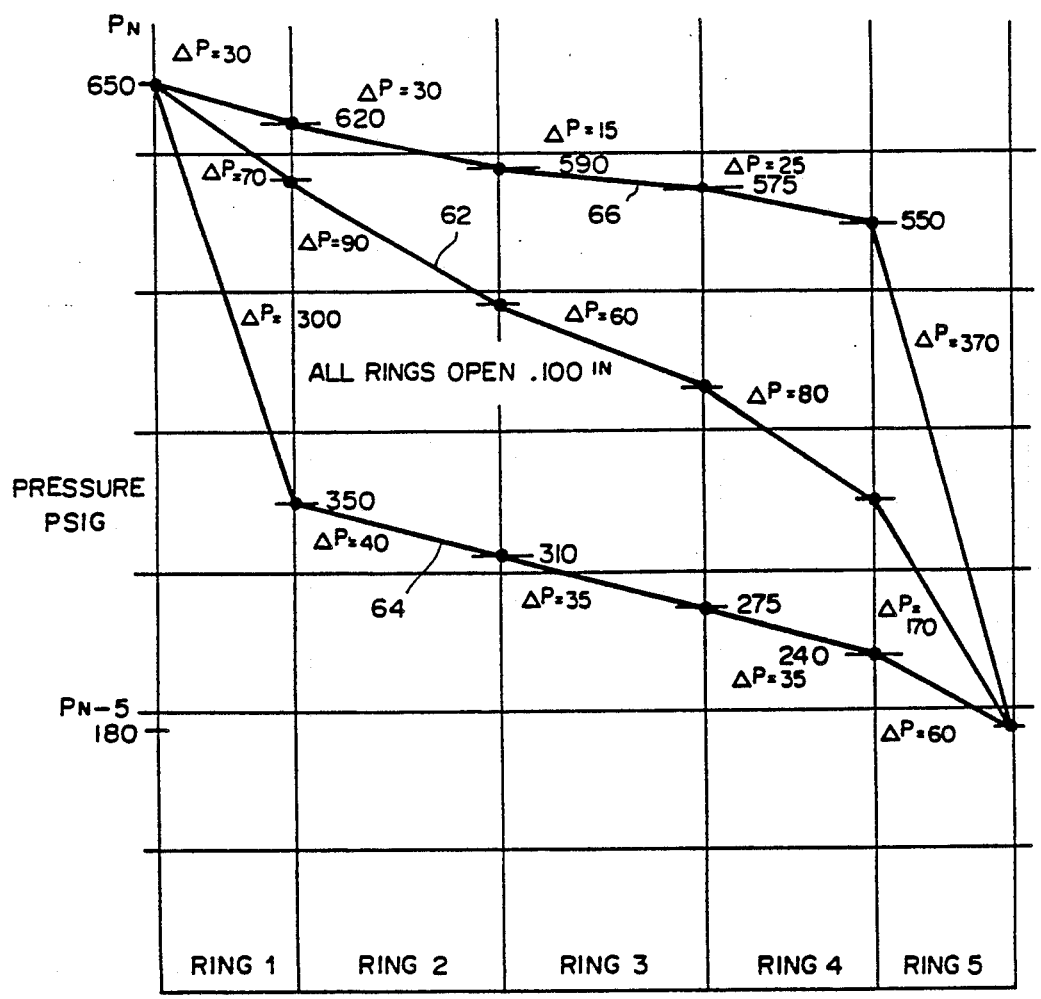
FIG. 4 is a set of curves showing the pressure relationships in the labyrinth seal of FIG. 1 under varying conditions of seal closure.

Referring now to FIGS. 1 and 4, when all of sealing rings 18-26 are in their open condition, the pressure drops through labyrinth seal 16 are as indicated by a pressure curve 62. Each of sealing rings 18-26 is subjected to the balance of forces produced as a result of its own upstream and downstream pressure. As the upstream steam pressure Pn increases, one of sealing rings 18-26 achieves an inward force sufficient to overcome the resilient and frictional forces and thus is moved to the closed position. Except for a remote fortuitous coincidence, the others of sealing rings 18-26 remain in the open condition. The closed sealing ring tends to prevent the remaining sealing rings from closing.

A pressure curve 64 in FIG. 4 illustrates the case when sealing ring 18 closes first. It will be noted that a large pressure drop exists across sealing ring 18, thus leaving relatively low pressure drops across sealing rings 20-28 downstream thereof. Indeed, the pressure drops against the downstream sealing rings are substantially smaller than those during the all-open condition on pressure curve 62. Accordingly, if a sealing ring is not closed when sealing ring 18 closes, it certainly will not close at the same supply pressure Pn. Before a downstream sealing ring can close, the supply pressure Pn must increase substantially before the next of sealing rings 20-26 can close. Again, the one which closes is at least partly probabilistic. When the second sealing ring closes, the tendency for the remaining sealing rings to close is again retarded. In the extreme, one or more of sealing rings 20-26 may remain open even after full operating steam pressure is supplied. Thus, less than the full seal capability is effected.

A pressure curve 66 illustrates the case where the extreme downstream sealing ring 26 closes first. As in the prior example, the closing of one higher pressure region robs the remaining sealing rings 18-24 of the pressure drops required for them to close. A similar analysis indicates that it matters little which of sealing rings 18-26 closes first, the result is substantially the same.

It is conventional in the prior art to bias sealing rings outward by installing springs between the segments forming them. The springs act in the tangential direction. We believe that it is preferable to apply radial force to the segments forming a sealing ring.

Figure 5A:
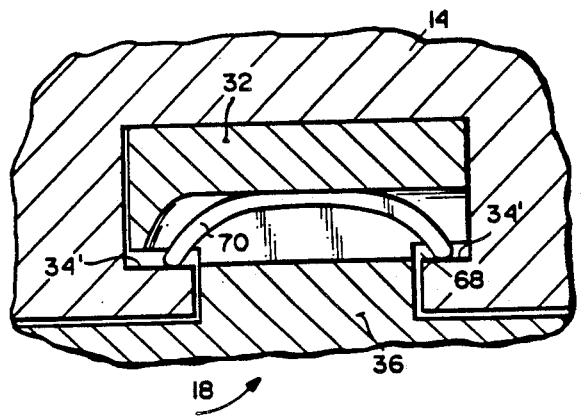
FIG. 5a is a cross section similar to that of FIG. 5 but showing the seal ring in an open position.
Figure 6:
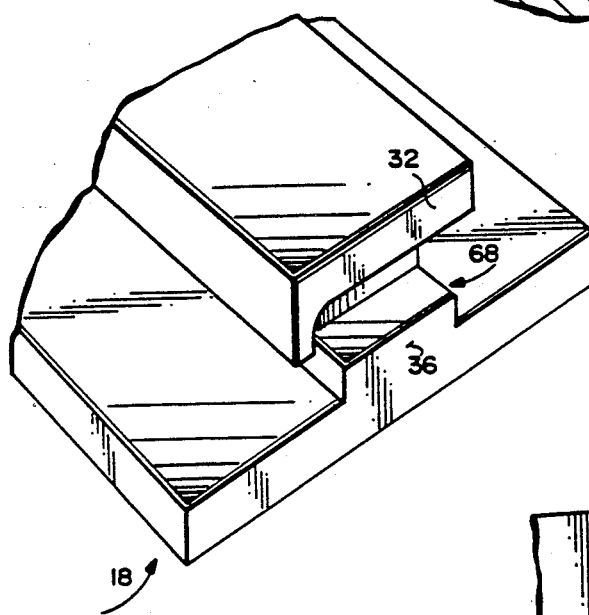
Figure 7:
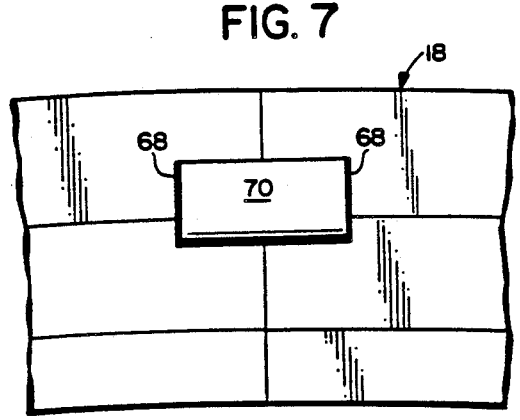
FIG. 7 is a partial side view of two adjacent sealing segments showing a biasing spring spanning the pair of adjacent segments.

One technique for applying an outward radial bias to sealing ring 18 is shown in FIG. 5, to which reference is now made. A notch 68 is formed in dovetail portion 32, preferably near each extreme end of each segment making up sealing ring 18. An arcuate leaf spring 70 (FIG. 8), placed in notch 68, tends to bias its segment of sealing ring 18 in the outward direction. Arcuate leaf spring 70 is shown in its fully stressed condition in FIG. 5, i.e., with the sealing rings fully closed, and in a fully relaxed condition in FIG. 5A, i.e., with the sealing rings fully open. Most preferably, and as best seen in FIGS. 6 and 7, notches 68 are formed at the extreme ends of all segments such that abutting notches are aligned to form a single pocket into which a single arcuate leaf spring is placed. Thus, the single leaf spring is effective for biasing the contiguous ends of two segments forming sealing ring 18.

Another approach to the provision of a variable clearance labyrinth seal, disclosed in the above-referenced technical paper, uses a sealed bellows arrangement, operating on bypassed steam, to effect closing of the rings. However, since each bellows received steam which had passed the ring immediately upstream thereof, each operates at a different pressure. Also, no external pressure source is provided to deal with special closing requirements such as may occur during prewarming. The shortcomings of the above-described prior art are, therefore, not overcome by this approach.

Referring now to FIG. 9, there is shown, generally at 72, a portion of a steam turbine according to an embodiment of the invention. A turbine shaft 12 is rotatably supported in a turbine housing 74. A labyrinth seal 76 includes sealing rings 78, 80, 82, 84 and 86, each having seal disks (not shown) extending radially inward to interfit with outwardly directed seal disks (also not shown) on turbine shaft 12.

A pressure connection 88 is connected to a conduit 90 leading to a pressure region 92 in turbine housing 74 above sealing ring 78. A second pressure connection 94 is connected to a manifold 96 communicating with pressure regions 98, 100, 102 and 104 above sealing rings 80, 82, 84 and 86, respectively.

Referring momentarily to FIG. 10, sealing ring 78, which is identical to all of sealing rings 80-86, includes a resilient seal 106 contacting an upstream wall 108 of pressure region 92. As noted in the discussion of the prior-art embodiment, the downstream portion is sealed by contact that is urged by the pressure differential acting in that direction. Thus, pressure region 92 is a sealed pressure chamber.

It is within the contemplation of the present invention to add a second resilient seal (not shown) contacting the downstream wall of pressure region 92. Such a second resilient seal, if used, is identical to resilient seal 106, and thus need not be further detailed.

Returning now to FIG. 9, at any appropriate time in the operation of steam turbine 72, a pressurized fluid may be applied to pressure connection 88 for urging the segments making up sealing ring 78 in the radially inward direction. This control is independent of the actuation of sealing rings 80–86.

During prewarming, sealing ring 78 is preferably closed by applying a pressurized fluid to pressure connection 88 at a pressure substantially exceeding the pressure Pn then existing at the upstream end of sealing ring 78. This pressure should be sufficient to urge sealing ring 78 into the closed position to prevent bypass flow of energetic steam which could cause turning gear rolloff. Sealing rings 80–86 are preferably left in the open condition at this time.

During acceleration and deceleration, sealing rings 78–86 remain in the open position. At a desired speed of turbine shaft 12 a pressurized fluid from an external source is applied through pressure connection 88 to urge sealing ring 78 into the closed position. This establishes the condition shown on pressure curve 64 in FIG. 4. Then a further source of a pressurized fluid is applied through pressure connection 94 to pressure regions 98–104. The pressure of the further source is preferably in excess of pressure Pn-1 existing upstream of sealing ring 80. One convenient source for this is the pressure Pn available upstream of sealing ring 78, and this is the preferred embodiment. It would be clear that, as soon as sealing ring 78 is closed by an external source of pressure, the opening forces acting on all of sealing rings 80–86 is substantially reduced due to the pressure drop across sealing ring 78. Thus, the upstream pressure Pn is very much higher than the pressures immediately upstream of each of sealing rings 80–86. As a consequence, sealing rings 80–86 close immediately following closure of sealing ring 78.

Although the use of pressure Pn as the source for closing sealing rings 80–86 is convenient and economical, this is not the only choice available. A further external source of pressurized fluid may be substituted for the pressure Pn without departing from the spirit and scope of the invention.

Referring now to FIG. 11, there is shown, generally at 110, a steam turbine according to a further embodiment of the invention. A further pressure connection 112 communicates with pressure region 98 over sealing ring 80. A manifold 96' communicates with sealing rings 82–86.

Figure 8:
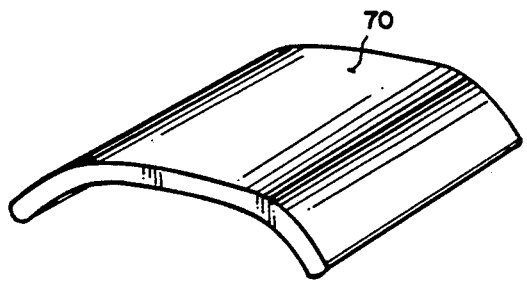
FIG. 8 is a perspective view of a biasing spring of the type shown in FIGS. 5, 5a and 7.

In this embodiment, sealing ring 78 and sealing ring 80 are capable of being controlled independently of each other and of sealing rings 82–86, while sealing rings 82–86 are gang operated. One skilled in the art would recognize that even more sealing rings could be controlled independently. However, until a technical or economic justification can be found for such additional independent control, the embodiments of FIGS. 6 and 8 are preferred. The most preferred embodiment is that in FIG. 6 wherein the second source of pressurized fluid is the upstream pressure Pn existing upstream of sealing ring 78. Indeed, with such an embodiment, manifold 96 can be connected directly to the upstream end of sealing ring 78 through turbine housing 74 without the need for external piping. This is an economical way to accomplish all of the objectives of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An improved seal for a rotating machine for minimizing leakage between rotating and stationary components from a higher pressure upstream end of the machine to a lower pressure downstream end of the machine, said seal comprising:

a plurality of segmented seal rings supported by, and at least partially contained in, annular grooves formed in the stationary machine component to permit motion of each of said seal rings between a larger diameter position and a smaller diameter position corresponding respectively to larger and smaller clearances of said seal rings with regard to the rotating machine component, said grooves each being partially defined by a pair of opposing spaced apart shoulders on said stationary component which form an opening of said groove extending radially into a clearance area between said stationary component and said rotating component;

each segment of each of said seal rings including an inner arcuate portion having a radially outwardly facing surface which is located opposite to a radially inward facing arcuate surface of said stationary component for limiting said larger clearance position by contact between said opposing surfaces, an outer ring portion disposed within one of said seal ring grooves for both axial and radial movement therein and having a pair of axial shoulders extending in opposite directions for making radial contact respectively with said pair of opposing spaced apart shoulders on said stationary component and thereby limiting said smaller clearance position, and a neck portion connected between said inner arcuate portion and said outer ring portion and extending between said opposing spaced apart shoulders, said neck portion having an axial thickness which is less than the distance between said opposing spaced apart shoulders to thereby axially locate said seal ring segment against one of said opposing spaced apart shoulders and provide a contact pressure seal at a downstream side of said neck portion;

a compressed spring means biased against each segment of each of said seal rings for forcibly causing said seal rings to move to said larger clearance positions;

first conduit means for admitting fluid from a first region of high pressure to said annular space between said stationary component and the segments of an upstream one of said seal rings, to controllably displace said segments to said smaller diameter positions; and second conduit means for admitting fluid from a second region of high pressure to the annular spaces between said stationary component and the segments of selected ones of said seal rings, other than said upstream seal ring, whereby said segments of said selected seal rings are displaced to said smaller diameter position.

2. The seal of claim 1 and including means for providing a pressure seal between said stationary component and the seal ring segments partially contained in said grooves.

3. The improved seal of claim 1, wherein said second conduit means admits fluid to said annular space of all of said seal rings except said upstream one.

4. The improved seal of claim 2, wherein said pressure seal means comprises a U-shaped sealing member disposed in a channel formed in said outer ring portions of said seal ring segments.

5. An improved seal for minimizing fluid leakage between the rotating and stationary components of a rotating machine from a higher pressure upstream end to a lower pressure downstream end, said seal comprising a multiplicity of segmented seal rings, said seal rings being captured in annular grooves formed in the stationary component of said machine so as to permit motion of the therein supported seal ring between a larger diameter position and a smaller diameter position corresponding respectively to larger and smaller clearances of said seal rings with regard to a rotating shaft of said machine, means for biasing said seal rings toward said larger diameter position, first means for controllably displacing the upstream one of said seal rings to said smaller diameter position, and second means for displacing selected ones of said seal rings, other than said upstream one, to said smaller diameter position, said first displacing means being independent of said second displacing means.

6. The improved seal of claim 5, wherein said grooves and said rings are so configured as to provide annular spaces between said rings and the stationary component and said first and said second displacing means each comprises conduit means for delivering pressurized fluid to said annular spaces.

7. The improved seal of claim 6, wherein the pressure of the fluid of said first displacing means exceeds the pressure of the fluid of said second displacing means.

8. For use in a fluid turbine having a central rotatable shaft, a labyrinth seal for minimizing the leakage of fluid between a region of higher pressure and a region of lower pressure through which the shaft extends, said labyrinth seal including a multiplicity of segmented seal rings, each of said seal rings being movably retained in an annular groove formed in a stationary casing of the turbine so as to permit motion of the seal ring between a larger diameter position and a smaller diameter position corresponding respectively to larger and smaller clearance of the seal ring with respect to a rotatable shaft, said seal rings being spring-biased toward said larger diameter position, the improvement comprising:
first and second separably operable means for applying steam at a pressure at least equal to the pressure in said region of higher pressure to at least one of said seal rings to displace said seal ring to said smaller diameter position.

9. The improved turbine of claim 8, wherein the steam applied by said first means is at a pressure in excess of the pressure in said region of higher pressure.

10. The improved turbine seal of claim 8, wherein the steam applied by said second means is at a pressure equal to the pressure in said region of higher pressure.

11. A labyrinth seal for a steam turbine, said steam turbine being of a type including a casing and a rotatable shaft, comprising:
a plurality of seal rings disposed about said shaft;
said plurality of seal rings dividing said turbine into regions of higher pressure and lower pressure;
means for biassing each of said seal rings in a radially outward direction, whereby a larger clearance between said seal rings and said shaft is provided;
first closing means for permitting an upstream one of said seal rings, immediately adjacent said region of higher pressure, to be urged radially inward by a first supply of a pressurized fluid, thereby reducing said clearance to a smaller clearance;
second closing means for permitting at least one of a remainder of said seal rings to be urged radially inward by a second supply of a pressurized fluid, thereby reducing said clearance to said smaller clearance;
first means for admitting said first supply of a pressurized fluid to said first closing means;
said first supply being at a pressure in excess of a pressure in said region of higher pressure;
second means for admitting said second supply of pressurized fluid to said second closing means; and
said first means for admitting being independent of said second means for admitting.

12. A seal according to claim 11, wherein said at least one of a remainder of said seal rings includes all of said seal rings except said upstream one.

13. A seal according to claim 11, wherein said at least one of a remainder of said seal rings includes only one of said remainder of said seal rings.

14. A seal according to claim 11, wherein said at least one of a remainder of said seal rings includes all of said remainder of seal rings.

15. A seal according to claim 11, wherein said means for biassing includes resilient means for biassing.

16. A segmented seal ring for minimizing leakage between rotating and stationary components of a rotating machine, said seal ring comprising:
a plurality of individual elongated sealing segments, each of which includes a dovetail portion, an annular ring portion and a neck portion extending between said dovetail portion and said annular ring portion, said neck portion having a width less than widths of said dovetail and annular ring portions;
and a notch formed at each end of said segment located substantially within said dovetail portion, said notch having a width greater than the width of the neck portion.

17. A seal ring according to claim 16 in combination with a plurality of biasing elements, and wherein a pair of said notches in adjacent segments is adapted to receive opposite ends of one of said biasing elements.

18. A seal ring according to claim 17 wherein said biasing elements comprise leaf springs.

* * * * *